(12) United States Patent
Latronico et al.

(10) Patent No.: US 11,676,202 B1
(45) Date of Patent: Jun. 13, 2023

(54) TRANSACTION PRE-NEGOTIATION AND OPTIMIZATION

(71) Applicant: United Services Automobile Association (USAA), San Antonio, TX (US)

(72) Inventors: Brian Latronico, San Antonio, TX (US); Teresa A. Mays, Helotes, TX (US); Claudia Anne Luna, Boerne, TX (US); David Anthony Phelps, San Antonio, TX (US); Kevin W. Thornley, Spring Branch, TX (US); Tracy Lent, New Braunfels, TX (US); James Malcolm Spears, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 121 days.

(21) Appl. No.: 17/231,890

(22) Filed: Apr. 15, 2021

Related U.S. Application Data

(63) Continuation of application No. 16/117,635, filed on Aug. 30, 2018, now Pat. No. 11,010,827.
(Continued)

(51) Int. Cl.
*G06Q 30/08* (2012.01)
*G06Q 30/0601* (2023.01)
*G06Q 40/03* (2023.01)

(52) U.S. Cl.
CPC ......... *G06Q 30/08* (2013.01); *G06Q 30/0623* (2013.01); *G06Q 30/0641* (2013.01); *G06Q 40/03* (2023.01); *G06Q 30/0639* (2013.01)

(58) Field of Classification Search
CPC ............... G06Q 30/08; G06Q 30/0623; G06Q 30/0641; G06Q 40/025
See application file for complete search history.

(56) References Cited

U.S. PATENT DOCUMENTS

| 7,571,128 B1 * | 8/2009 | Brown ................... G06Q 20/10 |
| | | 705/40 |
| 8,825,505 B1 | 9/2014 | Alava |
| | (Continued) | |

OTHER PUBLICATIONS dialog.proquest.com [online] "AutoGravity's National Expansion Forever Changes How Consumers Buy And Lease Cars: Revolutionary digital platform connecting car buyers, lenders and dealers available across the US," Jan. 25, 2017, retrieved on Aug. 12, 2020, retrieved from URL <https://dialog.proquest.com/proffesional/docview/1 B61301028?/accountid=131444>, 3 pages.

*Primary Examiner* — Scott C Anderson
(74) *Attorney, Agent, or Firm* — Fish & Richardson P.C.

(57) ABSTRACT

An integrated transaction platform facilitates a transaction, such as a purchase of a vehicle or other item. The platform provides a pre-negotiated purchase price for the item to facilitate a transaction to purchase the item from a seller, the transaction being substantially frictionless from the buyer's perspective. The pre-negotiation can involve a reverse auction process in which sellers bid to sell the item to a buyer. After the buyer has identified a particular item for purchase, sellers that have the item available are notified to provide a bid indicating a price at which the seller is willing to sell the item. The lowest bid is selected, and a purchase agreement is finalized based on the lowest bid. After the agreement is finalized, the buyer can accept delivery of the item without further negotiation with the seller, and thus with substantially reduced friction compared to traditional purchase scenarios.

20 Claims, 8 Drawing Sheets

Related U.S. Application Data

(60) Provisional application No. 62/554,407, filed on Sep. 5, 2017.

(56) References Cited

U.S. PATENT DOCUMENTS

| | | |
|---|---|---|
| 9,519,901 B1 * | 12/2016 | Dorogusker .......... G06Q 20/322 |
| 9,947,024 B1 * | 4/2018 | Shariff ............... G06Q 30/0259 |
| 10,810,656 B1 | 10/2020 | McCroskey et al. |
| 11,328,345 B1 | 5/2022 | McCroskey et al. |
| 2003/0046179 A1 | 3/2003 | Anabtawi et al. |
| 2004/0002915 A1 | 1/2004 | McDonald |
| 2011/0153449 A1 | 6/2011 | Hite |
| 2011/0251897 A1 | 10/2011 | Litvack et al. |
| 2012/0209730 A1 * | 8/2012 | Garrett .................. G06Q 30/06 |
| | | 705/15 |
| 2013/0311306 A1 | 11/2013 | Liu et al. |
| 2015/0081474 A1 | 3/2015 | Kostka et al. |
| 2015/0221010 A1 | 8/2015 | Ming |
| 2015/0254762 A1 | 9/2015 | Fisher |
| 2016/0180420 A1 | 6/2016 | Gamel, Jr. et al. |
| 2016/0239907 A1 | 8/2016 | Dolen |
| 2016/0314529 A1 * | 10/2016 | Dolle ................... G06Q 40/025 |
| 2017/0116603 A1 | 4/2017 | Bogaard |
| 2017/0169399 A1 * | 6/2017 | Areshidze .......... G06Q 30/0283 |
| 2017/0185950 A1 * | 6/2017 | Roet .................... G06Q 10/087 |
| 2017/0235436 A1 * | 8/2017 | Hooton ............... G06F 3/04817 |
| | | 705/7.11 |

* cited by examiner

110

How Much Should I Spend?

302 {
What is your take-home pay?

Pay Frequency
[ Monthly ▼ ]

Pay Amount:
$3,200
}

304 {
Are you trading in a vehicle?

● Yes

○ No
}

306 {
Vehicle
[ 2012 Example X3 ▼ ]

What is the value of your trade-in?
$10,000

How much is owed on your trade-in?
$5,500

How much is your down payment?
$2,500
}

308 {
[ Submit ]

[ Cancel ]
}

*FIG. 3*

TRANSACTION PRE-NEGOTIATION AND OPTIMIZATION

CROSS-REFERENCE TO RELATED APPLICATION

This application is a continuation application of and claims priority under 35 U.S.C. § 120 to U.S. application Ser. No. 16/117,635, filed on Aug. 30, 2018, which is related to, and claims priority to, U.S. Provisional Patent Application Ser. No. 62/554,407, titled "Transaction Pre-Negotiation and Optimization," which was filed on Sep. 5, 2017, the entire contents of each of which are incorporated herein by reference.

BACKGROUND

Typically, purchasing a vehicle or other expensive item may be a stressful experience for an individual. The potential purchaser walking through a showroom or a vehicle sales lot may be confronted with sales personnel whose goal is to maximize the sale price and who may not necessarily be focused on the purchaser's concerns. Moreover, the purchaser may be disadvantaged during negotiations with the seller, given that the purchaser may not have ready access to objective information that would inform the purchase decision. For these reasons, the purchaser may lack confidence that they are getting the best deal or that their other concerns have been adequately addressed.

SUMMARY

Implementations of the present disclosure are generally directed to facilitating and/or optimizing a transaction. More specifically, implementations are directed to providing an integrated transaction interface and platform that integrates information from various data services to provide cost information and recommendations for a transaction, and that provides an auction-based pre-negotiation to optimize a transaction.

In general, implementations of innovative aspects of the subject matter described in this specification can be embodied in a method that includes the following operations: transmitting, to a service executing on at least one remote computing device, a request that identifies an item for a transaction and receiving, in response, seller information that is transmitted by the service, wherein the seller information describes: i) an initial price for the item, and ii) sellers that have the item available; transmitting a bid request to a respective seller computing device associated with each of the sellers and receiving, in response, a respective bid price from each seller computing device; selecting at least one bid price that is lowest among the bid prices received from the seller computing devices; determining a seller that corresponds to one of the selected at least one bid price; transmitting, to the seller computing device of the determined seller, a seller confirmation message confirming that the seller commits to the transaction for the item at the bid price provided by the determined seller; and generating a loan application for the transaction for the item, based at least partly on the bid price provided by the determined seller.

These and other implementations can each optionally include one or more of the following innovative aspects: the operations further include transmitting a user confirmation message to a user device, the user confirmation message that indicates the determined seller and the bid price provided by the determined seller; the operations further include receiving one or more search terms entered through a user interface (UI) to search for the item; the operations further include determining a plurality of items corresponding to the one or more search terms; the operations further include receiving an indication of the item that is selected through the UI from the plurality of items; the operations further include determining a total periodic cost for the item, including a periodic payment for a loan to be used to purchase the item, the loan corresponding to the loan application; the total periodic cost is a monthly cost of the item; an amount of the loan is the initial price; the amount of the loan is adjusted based on the bid price provided by the determined seller; the operations further include calculating a first periodic cost of the item, wherein the first period cost is calculated based at least partly on at least one characteristic of a purchaser of the item; the operations further include determining at least one second periodic cost of the item, wherein the at least one second periodic cost is calculated based at least partly on at least one characteristic of the item; the operations further include determining the total periodic cost of the item as a sum of the first periodic cost and the at least one second periodic cost; the operations further include presenting the total periodic cost through a UI; the item is a vehicle; the at least one second periodic cost includes one or more of a fuel cost, a maintenance cost, a repair cost, and an insurance cost; the first periodic cost is a periodic payment for the loan that is calculated based on at least one financial characteristic of the purchaser; determining the at least one second periodic cost of the item includes requesting, from at least one other service, item information that describes the at least one second periodic cost of the item; determining the at least one second periodic cost of the item includes requesting, from at least one other service, item information associated with the item, and calculating the at least one second periodic cost of the item based on the item information and at least one behavioral characteristic of the purchaser; the item information describes typical gas mileage for the vehicle; the at least one behavioral characteristic includes a typical distance driven during a period used to calculate the at least one second periodic cost; and/or calculating the at least one second periodic cost includes calculating an expected fuel cost based on the gas mileage of the vehicle and the typical distance driven.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2-5 depict example interfaces for cost analysis, according to implementations of the present disclosure.

DETAILED DESCRIPTION

Figure 1:
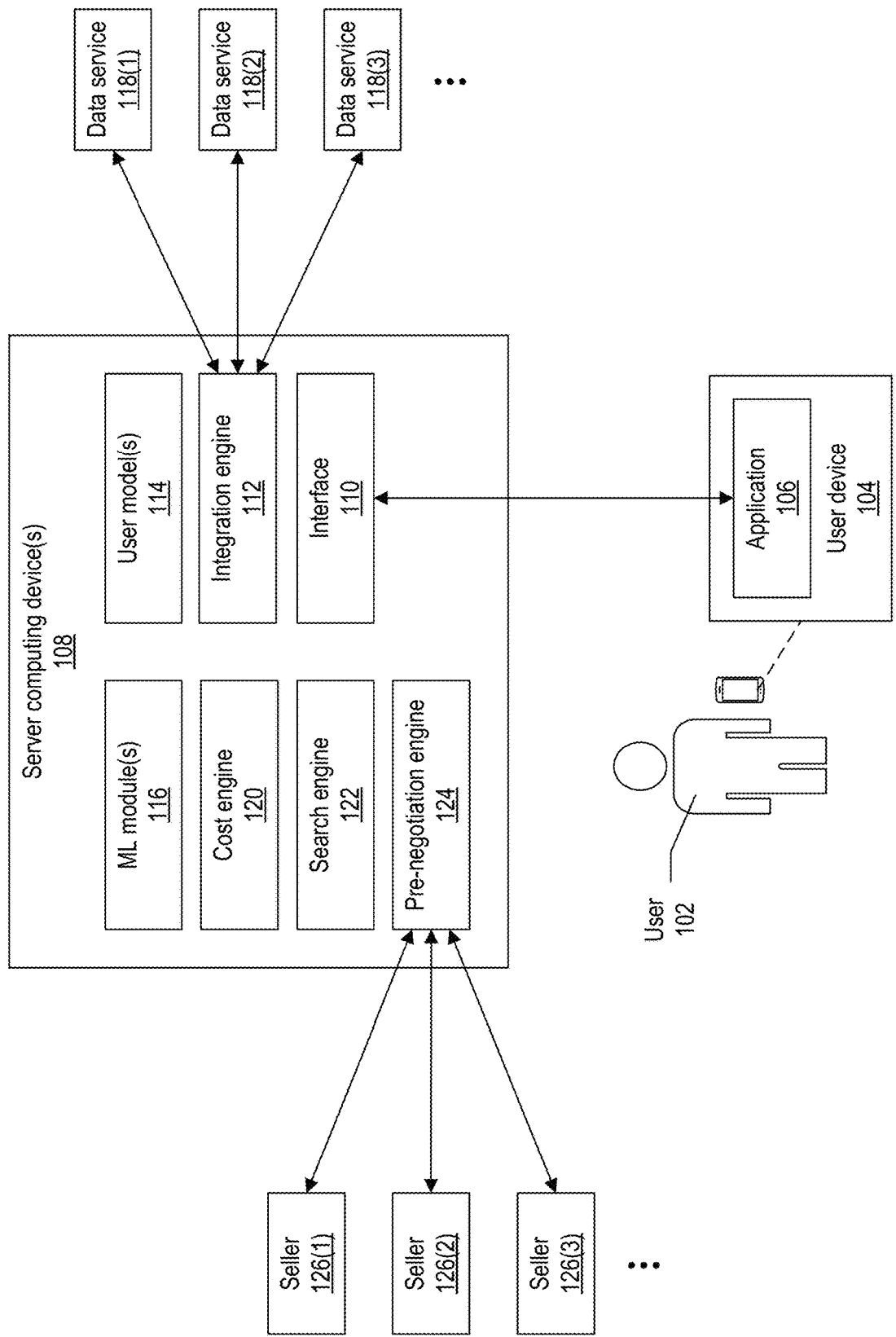
FIG. 1 depicts an example system for item purchase pre-negotiation, according to implementations of the present disclosure.

Implementations of the present disclosure are directed to an integrated transaction platform (also described as a hub) to facilitate a transaction, such as a purchase of a vehicle or other item. The platform provides a pre-negotiated purchase price for the item to facilitate a transaction to purchase the item from a seller, the transaction being substantially frictionless from the buyer's perspective. In some implementations, the pre-negotiation involves a reverse auction process in which sellers of an item bid to sell the item to a buyer (also described herein as the user or the purchaser). After the user has indicated the particular item (e.g., vehicle) they wish to buy, multiple sellers that have the item available to sell are notified to provide seller bids, indicating a price at which the seller is willing to sell the item to the buyer. The lowest seller bid is selected, and a purchase agreement between the seller and the user is finalized based on the lowest bid. In some implementations, the lowest N bids (e.g., N=3) are selected and presented as options to the user, who picks one of the sellers. In such examples, the purchase agreement between the selected seller and user is finalized. Other information may be used, in addition to the bids, to select the seller(s). For example, information regarding seller location, reputational metric(s), seller history (e.g., how long in business, past transactions involving seller, etc.), and/or other information can also be used. After the agreement is finalized, the user may travel to the seller (e.g., a car dealership) and pick up the item, in some instances without any additional negotiation required at the seller, and thus with substantially reduced friction compared to traditional purchase scenarios. In some examples, the item may be delivered by the seller to the user, instead of the user travelling to the seller to pick up the item.

In some implementations, after the particular seller has been determined, information can be received from the seller which describes the particular vehicle being sold by the seller, such as the vehicle of the make, model, year, and/or other characteristics requested by the user. The particular vehicle information can include the vehicle identification number (VIN) of the vehicle, and/or other identifying information. Once the VIN is received, the platform can perform operations to determine financing for the vehicle, such as a loan to be offered to the user. In this way, the platform can lock in financing for the user prior to the user visiting the seller (e.g., the dealership). The platform can also lock in other aspects for the user, such as an insurance policy. By locking in financing and other details for the user prior to the user visiting the seller, the platform enables a hassle free purchase experience for the user, and enables the user to employ the seller as a delivery mechanism for the vehicle, with vehicle selection, price, and financing determined upfront prior to the user visiting the seller in person.

Traditionally, purchase of an item such as a vehicle involves considerable haggling on the part of the buyer, and the buyer may be at a disadvantage given a lack of information regarding the item being purchased as well as other add-ons, such as a warranty or optional features. For example, a buyer may enter a car dealership with a previously arranged loan from their bank, and with an idea of which vehicle they wish to purchase. The dealer may, on-site, make a counter-offer regarding the loan and/or attempt to up-sell the buyer. Lacking complete information, the buyer may accept the counter-offer even though it may not be in the best financial interests of the buyer. The dealer may even convince the buyer to purchase a different vehicle, which the buyer cannot afford and/or which may not be optimal for the buyer's needs. By providing a pre-negotiated agreement to purchase a particular item (e.g., vehicle), using a loan or other funding that is arranged up-front and locked in, the platform described herein enables the buyer to enter a potentially high-pressure sales environment with confidence that the deal is locked in and no haggling will be needed to purchase the vehicle, and with further confidence that the terms of the loan and the vehicle purchase have been pre-negotiated to optimally suit the buyer's financial situation and other characteristic(s).

Implementations support various entry points for the user (e.g., buyer) to identify the item (e.g., vehicle) they wish to buy, and to initiate the pre-negotiation process. In some implementations, the user accesses a user interface (UI) provided by the platform, and uses the UI to search for and identify the particular item that the user wishes to buy. The search may be based on search terms, such as make, model, year, color, type of vehicle, used versus new vehicles, and so forth. In some implementations, as described further below, the UI enables the user to search for a type of vehicle based on user-entered keywords that indicate the user's preferred activities (e.g., camping, biking, long road trips, etc.), lifestyle (e.g., regular commuter, retiree, parent, etc.), expected use of the vehicle (e.g., for commuting to work, occasional trips around town, participating in a rideshare service, etc.), and/or other user characteristics. The platform may then identify a type of vehicle, and/or a set of possible vehicles, that may be suitable for the user, and the user may select a particular vehicle from the search results. In some instances, the platform may access financial information and/or other data regarding the user, such as the user's income, assets, debts, and so forth, and the search results may indicate those vehicles that are recommended for the user given their financial situations. The user may be paired with a loan offered by a bank, and vehicle(s) may be recommended based on financing terms for the loan that the user can afford, given their financial circumstances.

In some implementations, the platform calculates a total cost of ownership (TCO) for one or more vehicles, including cost of loan payment, insurance, fuel, expected maintenance/repairs, and so forth, and the TCO information may be presented to the user to help them choose an appropriate vehicle. TCO calculation is described further below. The TCO may be a periodic cost of owning the vehicle, such as a sum of the monthly costs for fuel, insurance, maintenance, repairs, and so forth.

In some implementations, the user may identify a particular vehicle of interest by scanning a vehicle identification number (VIN) using their mobile computing device. The VIN may be uploaded to the platform and used to identify other instances of the same make/model/year vehicle that are available from local sellers. The particular scanned vehicle itself may also be an option for purchase, if for example the user has scanned the VIN while on a dealer lot. Alternatively, the user may scan a VIN of a vehicle they like (e.g., a rental car, a friend's car, etc.), and the information regarding the scanned vehicle may be used by the platform to seed a vehicle search for the user.

After the user has indicated (e.g., through the UI of the platform) a particular vehicle to purchase, the platform may send a request to a remote (e.g., external) service, requesting an initial price quote and a list of sellers (e.g., local sellers) that have the vehicle available for purchase. The remote service may respond with an initial estimate of a sale price for the vehicle, and indicate the one or more sellers that have the item in stock or otherwise available for purchase. The list of seller(s) may be notified that the user wishes to purchase the item, and the seller(s) may be asked to bid on a sale price to offer the user, given the particular financial package that has been determined for the user. Through a reverse auction process, the seller with the lowest bid may be selected to be the actual seller of the vehicle. The user may be notified of the selection of the seller, and the seller's bid, and the user may be asked to confirm the purchase. Based on the user's confirmation, the seller is notified that the user will be purchasing the vehicle from them. This notification may constitute an agreement that the seller is to sell the vehicle, to the user, for the price that the seller bid. In some implementations, the platform may require a minimum number of bids from different sellers, to ensure that the price is the best available price for the buyer.

In some implementations, the seller may agree, through their participation in the reverse auction managed by the platform, to abide by a set of terms that are defined by the platform, and the seller may not be allowed to vary the terms of the sale following the pre-negotiation of the sale. For example, the seller may not be allowed to attempt to up-sell the buyer, or otherwise alter the terms regarding a warranty, options on the vehicle, and/or the particular vehicle being sold. In some instances, the platform may allow some variation within the terms. For example, the seller may be permitted to offer a warranty so long as the warranty is better (e.g., provides greater value to the buyer) than the previous warranty available to the buyer. Apart from predetermined terms which are available for variation, if any, the purchase agreement is pre-negotiated and "locked in" prior to the buyer accepting delivery of the vehicle. In particular, the purchase price of the vehicle may be set through the pre-negotiation process, and may not be altered by the seller (or buyer).

In some instances, if the buyer is trading in a currently owned vehicle to partially offset the purchase price of the new vehicle, the terms of the trade-in may also be included in the pre-negotiated agreement. For example, the request for bids may include an indication of the vehicle that the buyer is trading in (e.g., its make, model, year, condition, etc.), and the sellers may include trade-in value in their submitted bids.

In some implementations, the buyer may be provided with status updates throughout the pre-negotiation process. For example, the buyer may be informed when the request for bids has been sent, when bids have been received from the sellers, and/or when a lowest bid has been identified. These and any other notifications may be provided to the buyer through the UI of the platform, and/or through other channels (e.g., email, text message, voice message, etc.). In some implementations, the platform may provide a UI through a mobile app executing on the buyer's smartphone or other mobile computing device. On detecting that the buyer's location, as indicated by a satellite-based navigation system such as the global positioning system (GPS), is at the seller (e.g., at the dealership) for longer than a threshold period of time (e.g., 15 minutes), the platform may provide a notification, through the mobile app, asking the buyer whether they require assistance or advice while at the seller. The mobile app may include a control that lets the buyer request assistance and, in response, the platform may provide information regarding the pre-negotiated terms of the sale, the loan that has been previously approved for the buyer, the terms of warranty or other aspects that may be up for discussion at the seller, and so forth.

The platform provides an integrated user experience to assist a buyer through all stages of buying a vehicle or other item. The platform can integrate information of multiple types, from multiple sources. Such information may be associated with the purchase of the item. For example, the platform may receive and integrate information regarding user vehicle preferences, financing for the vehicle, insurance to cover the vehicle, total cost of ownership for the vehicle (e.g., including projected maintenance costs, fuel costs, and so forth), and/or other information. The platform may present the integrated information, or a portion of the integrated information, through a UI, such as a mobile application (app) executing on the user's portable computing device (e.g., smartphone, tablet computer, wearable computer, etc.).

The information provided through the UI may provide decision support for the user at various stages of the vehicle purchase process, by presenting the integrated data from a variety of sources, where the data is relevant to the purchase process. The UI, also described as the interface, may enable the user to do research into various vehicles that may be purchased, search for vehicles based on input criteria, view information on a variety of vehicles, view information regarding cost of insurance for vehicles. The interface may also present information for budgeting, such as an indication of how much the user can spend on the vehicle (e.g., a maximum amount, a recommended range of vehicle prices, etc.).

A total cost of ownership may be determined for the particular user, either for a particular vehicle or for a vehicle purchase in general. In some implementations, the interface may present a set of recommendations for the user regarding which vehicles may fit within the user's budget or other financial constraints, based on the total cost of ownership. Total cost of ownership may be the total periodic (e.g., monthly) cost of owning and/or operating the vehicle, and may include monthly costs for a loan payment, insurance, fuel, maintenance, repairs, and/or other expenses associated with the vehicle.

Traditionally, the data needed to help a user purchase a vehicle is available from multiple, disparate data sources. For example, the user may consult an insurance company web site to gather insurance information, a vehicle search web site (or dealer web site) to search for vehicles, a financial institution to determining financing for the vehicle and/or budgetary considerations, and so forth. Accordingly, the current vehicle purchase experience requires a potential purchaser to navigate multiple interfaces and/or in-person consultations, which may be time-consuming and require considerable effort by the purchaser. Implementations provide a centralized platform (hub) of information that the user can access, through an interface, to facilitate their vehicle search and purchase process.

In some implementations, the purchase process may include multiple stages such as determining financing for a vehicle, searching for vehicle(s) to purchase, determining insurance on the vehicle, purchasing the vehicle, and so forth. The platform may track where the user is in each stage of the process, and store the user's progress for each stage. The interface may access the progress information tracked by the platform and present, to the user, their current status with respect to each stage, such as the status of the user with respect to determining how to finance the vehicle (e.g., loan application(s)), determining insurance (e.g., policy application(s), option(s) for coverage, etc.), determining the user's budget, and so forth. Information for the various stages of the purchase process may be determined based on the user's situation, such as whether the user is trading in another vehicle to purchase their next vehicle, whether the user is purchasing a new versus a used vehicle, whether the user is buying versus leasing a vehicle, and so forth.

The interface may include multiple tiles, each presenting information regarding a stage of the purchase process. In some implementations, the tiles are dynamic and may be updated (e.g., in real time) based on changes in the underlying data. For example, the tile describing the status of financing for a vehicle may be updated dynamically to indicate that a loan application has been approved for a particular amount, with particular loan term, interest rate, and so forth. The interface may receive real time updates of the information from the platform, and the platform may track the status of each stage in a database that is updated with current information regarding each stage. The database may track which stages have been completed, which stages are yet to be initiated, which stages are in progress, and the particular status of each stage, and the interface may present progress information (e.g., not started, completed, in progress) for each of the stages. The interface and platform may enable the user to work on the various stages in any suitable order, serially and/or in parallel. For example, the user may apply for financing and begin searching for vehicles even before financing (e.g., a loan application) has been approved and completed.

In some implementations, the interface can dynamically rearrange the various tiles corresponding to various stages of the purchase process, as a way of indicating that some stages may be higher priority than others. In this way, implementations may guide the user through the purchase process in an optimal, time-efficient, and/or cost-effective order of stages. The interface may provide notifications to the user to indicate information that is missing, to be provided by the user and/or modified by the user, for various stages. The interface may also send urgent notifications (e.g., as warnings through the interface and/or communications to the user) to indicate information that is urgently needed from the user and/or action(s) that the user should perform soon.

In some implementations, the user may be provided with vehicle recommendations that are based on the determined total cost of ownership of a vehicle, the user's budget, expressed user preferences, and/or other criteria. Such recommendations may be adjusted dynamically in response to changes in other data. For example, a recommendation may be made that the user cut back on other expenses to increase their vehicle buying budget. Modification of the budget information may then lead to a change in which vehicles are shown to the user.

In some implementations, the platform may communicate over one or more networks with one or more data services that may be external to, or remote from, the platform. Each data service may provide a particular type of data, such as vehicle search data, insurance data, budget data, total cost of ownership data for vehicles, and so forth. The platform may integrate the data that is received from the various data services, to provide an integrated vehicle purchase experience to the user through the interface. In some instances, an interface of a data service may be presented within the interface of the platform, to provide a seamless user experience (e.g., with consistent branding, look-and-feel, etc.) to the user. A single login by the user may be sufficient to access the interface of the platform as well as the interface(s) of the various data service(s), the data service interface(s) being embedded in the overall interface of the platform. The single login may be based on the validation of user credentials to authenticate the user, such as a username, password, personal identification number (PIN), biometric data (e.g., fingerprint, voice print, facial recognition, etc.), and so forth.

In some implementations, data regarding the user may be collected and employed to pre-seed a vehicle search session for the user with one of the external data services. For example, information may be gathered regarding the user's budgetary constraints, vehicle preferences, new versus used vehicle preference, and so forth, and such information may be provided to a vehicle search data service. The vehicle search data service may prepare a list of vehicles that satisfy the constraints for the particular user, such that the list of vehicles is ready for immediate presentation to the user when the user enters the vehicle search stage of the purchase process.

In some implementations, vehicle searching may be facilitated through use of a user model that is developed for each particular user. The user model may predict what vehicles are suitable for a user, given the user's expressed or implied vehicle preferences, budgetary constraints, and/or other factors. In some implementations, the user model may be trained and/or refined using one or more machine learning (ML) techniques, including supervised and/or unsupervised machine learning. The model may initially be developed based on budgetary information for the user. The model may then be refined based on the user's express vehicle preferences, as determined through the user's browsing of vehicles through the vehicle search data service. For example, the user may "like," "favorite," and/or save a particular vehicle in a list of possible purchase options, and such expressed user preferences may be captured and used to further refine the user model for predicting suitable vehicles for the user. The user's implied preferences may also be used to refine the model. Such implied (or inferred) preferences may be determined based on the amount of time a user spends viewing information for particular vehicles through the vehicle search data service, even in instances where the user does not explicitly "like" or add the vehicle to a favorites list.

The user may select certain vehicles that are presented to the user as (e.g., pre-seeded or pre-populated) search results through the vehicle search data service. The data service may send the selection information back to the platform, which may use the selection information to refine the user model for the user. The selection information may also be used to populate a selected vehicles tile of the interface, indicating that some progress has been made in the vehicle selection stage of the purchase process. The selection of cars may be an iterative process. For example, after the user selects a first set of vehicles that they are interested in, the user model may be refined based on such selections, and the user may be presented a more specific or otherwise altered set of possible vehicles through the vehicle search data service. Any suitable number of iterations of this present-select-refine cycle may be performed until the user decides on a particular vehicle to target for purchase. In this way, the user model may be a learning model that adjusts based on the user behavior and/or other sources of dynamic information regarding the user. The platform may store a list of saved vehicles that the user has "liked," "favorited," or otherwise expressed an interest in through the vehicle search data service.

In some implementations, the interface may include various tiles showing the current status and relevant information for each of multiple stages in the vehicle purchase process. In some implementations, this user experience is dynamically updated such that each tile presents up-to-date information and status for each stage of the process. The interface can be a portable user experience that is presented in a variety of environments that are relevant to the purchase process. For example, while the user is browsing vehicles through the vehicle search data service, and engaging in the vehicle selection stage of the process, the overall interface may be available to show the user various information regarding other stages, such as the status of financing, budget constraints, insurance application, and so forth. The interface may follow the user across different experiences, such as the vehicle search data service, a third party financing data service, third party insurance data service, and so forth. The interface may also be a mobile interface that enables the user to access the information when the user is on-site at a vehicle dealership or in some other purchase environment. Thus, implementations provide the user with easy access to relevant information in situations where such information may be useful, such as when negotiating a vehicle purchase with a dealer, negotiating financing with a lender, and so forth.

In some instances, the interface may be presented based on location context, such as the current location of the user's computing device determined through a satellite-based navigation system (e.g., GPS) or through other techniques. The presentation of the interface, such as the ordering of the tiles, may be adapted to ensure that the information that is more relevant to the user's location is presented at the top (or otherwise prominently) in the interface. For example, based on a determination that the user is currently on-site at a dealership, the interface may present vehicle information for those vehicles that are currently present (in stock, available for purchase) at that dealership.

The information presented to the user through the interface may include one or more of the following:

Price information, describing a price of vehicle(s). In some instances, the price may be a guaranteed price, a guarantee that the user may purchase the vehicle at the price for a certain period of time. For example, the guarantee may hold the price of the vehicle for up to 24 hours.

Loan information, describing the terms of a loan that the user may take out to finance their purchase of a vehicle. The loan information may include an amount of the loan, a payoff amount, an interest rate, monthly payments (e.g., principal and/or interest payments), a term of the loan (e.g., number of months to pay off the loan), an indication of the financial institution providing and/or servicing the loan, and so forth.

Insurance information, describing the terms of an insurance policy that the user may take out to insure a vehicle. The insurance information may include terms such amount(s) of property damage and/or injury coverage, premiums, deductibles, time period for the policy, conditions on the policy, and so forth.

Vehicle history information, describing a history of repairs, maintenance, parts replacement, accidents, prior ownership, and/or other information regarding the history of the vehicle (e.g., in the case of a used vehicle).

Pre-negotiation information, including a description (e.g., name, location, etc.) of the seller(s) that have submitted bids in the reverse auction, the amount of each bid, and an indication of the lowest bid that is to be used for the purchase. This information may also provide an indication of the timing of the reverse auction, including when the bids were requested, when each bid was received, the time limit for receiving bids, and the amount of time remaining until bidding is closed.

Other vehicle cost information, including estimated maintenance, repair, and/or operating costs of a vehicle for a period of time in the future. Such cost information may include fuel costs, costs to replace engine components, tires, or other parts of the vehicle, estimated maintenance costs based on the costs of other vehicles of the same make, model, year, and/or other characteristics, and so forth. The periodic (e.g., monthly) loan payment, insurance premium, and other costs such as fuel, maintenance, repairs, and so forth may be added together to determine a total periodic (e.g., monthly) cost of ownership of a vehicle, and the total cost may be presented in the interface as described further below.

Other vehicle information, including the availability and/or price of other instances of the same and/or similar vehicle at other (e.g., nearby) sellers. In some implementations, the interface may enable the user to specify a distance or range to search for similar nearby vehicles, e.g., within 5 miles of the current location, within 50 miles of the current location, and so forth. Implementations may employ any suitable technique for determining the current location of the user and/or the user device. For example, location may be determined using a satellite-based navigation system such as the global positioning system (GPS). Nearby vehicle(s) may include new vehicle(s), used vehicle(s), and/or both new and used vehicle(s), according to the expressed preferences of the user for new versus used vehicles. Nearby vehicle(s) may include vehicle(s) that are available for purchase and/or vehicle(s) that are available for rental or lease, according to the expressed preferences of the user for purchasing versus leasing a vehicle.

In some implementations, the platform described herein operates to determine total cost of ownership and facilitate the purchase of item such as vehicles. Vehicle(s) may include automobiles, motorcycles, mopeds, campers, recreational vehicles, off-road vehicles, watercraft, aircraft, and/or other types of vehicles. The implementations described herein may also be used to determine total cost of ownership and facilitate the purchase of other types of items, including but not limited to home electronics, appliances, other types of consumer products, real property (e.g., houses or other structures), and so forth.

FIG. 1 depicts an example system for transaction pre-negotiation and processing, according to implementations of the present disclosure. As shown in the example, a user 102 may employ a user device 104. The user device 104 may be any suitable type of computing device, such as a portable computing device (e.g., smartphone, tablet computer, wearable computer) or less portable computing device (e.g., laptop computer, desktop computer, etc.). The user device 104 may execute an application 106 (e.g., an app) that is employable to access an interface 110 provided by the transaction platform. The transaction platform (also described herein as the platform) executes on, and is provided by, any suitable number and type of server computing devices 108. The interface 110 may be presented within the application 106 executing on the user device 104, such as a web interface 110 rendered in a web browser executing on the user device 104, or as the application interface 110 of a (e.g., native) app executing on the user device 104.

In some implementations, the user 102 may be required to login to the application 106, and be authenticated as an authorized user of the application who is authorized to access the interface 110. Authentication may be based on credential(s) such as a login name, password, personal identification number (PIN), biometric data, and so forth.

Figure 2:
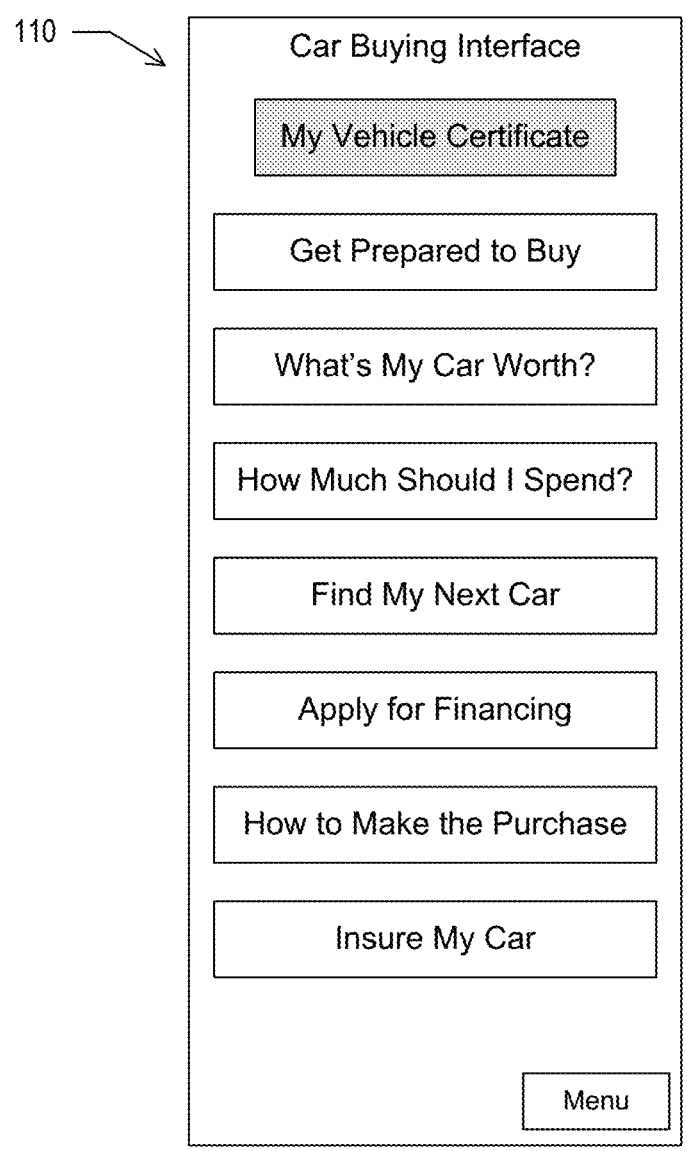
Figure 4:
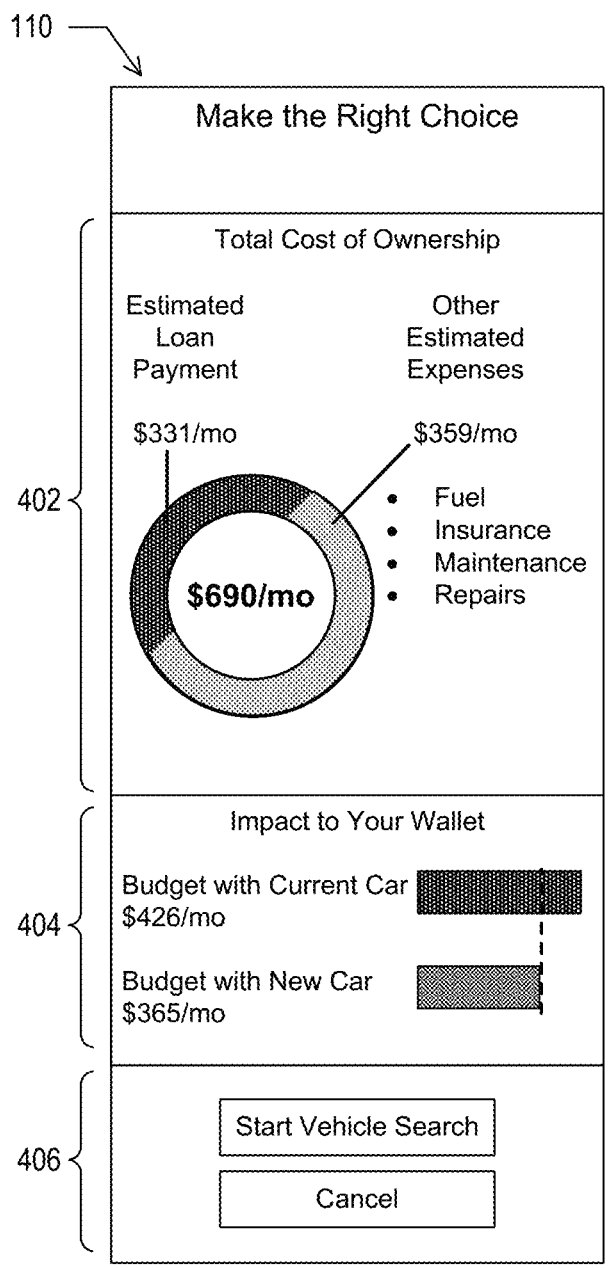

The platform may include an integration engine 112 that receives data from any suitable number of data services 118. For example, the data services 118 may include a vehicle search data service as described above. The platform 108 may also execute one or more ML modules 116 that generate and/or refine user model(s) 114. As described above, a user model 114 for the user 102 may be employed to determine one or more vehicles to be presented to the user 102, e.g., through search results provided in an interface of a vehicle search data service 118. As described above, one or more of the data services 118 may provide a data service interface that is presented within (e.g., embedded in) the overall interface 110 of the platform 108. Examples of the interface 110 are shown in FIGS. 2-4, described further below.

In some implementations, the data service(s) 118 include one or more services that provide data to be used in calculating a total cost of ownership of a vehicle. For example, a service 118 may provide information that describes the predicted maintenance cost, repair cost, fuel consumption, and/or other characteristics of a vehicle, for use in calculating total cost of ownership. In some instances, the data service(s) 118 are external to the server computing device(s), and communicate with the integration engine 112 over one or more networks. For example, the data service(s) 118 may each expose an application programming interface (API) or other type of interface that the integration engine 112 can use to request information from the service. The integration engine 112 may communicate with the service(s) 118 through other mechanisms as well, such as through remote procedure calls (RPCs) web interface (e.g., HTTP or other suitable protocol) requests, and so forth.

In some implementations, the platform executes a cost engine 120 and a search engine 122. The search engine 122 may search for vehicles based on search criteria provided, by the user 102, through the interface 110. For example, the user 102 may search for vehicles according to make, model, year, type of vehicle (e.g., coupe, sedan, convertible, pick-up truck, etc.), transmission type, gas mileage, color, and/or other criteria. The search engine 122 may determine a list of vehicles that correspond to the search criteria, and the list may be presented to the user 102 through the interface 110. In some implementations, the search engine 122 may search for vehicles based on other criteria, in addition to or instead of searching based on vehicle characteristics. For example, the search engine 122 may search based on the expressed interests of the user 102 or the ways in which the vehicle is to be used, as indicated by the user 102. As a particular example, the user 102 may indicate an interest in camping, canoeing, skiing, or other outdoor activities, or the user 102 may indicate that they intend to use the vehicle for their daily commute, to transport family members, to participate in a rideshare service, or for other purposes. The search engine 122 may take this information into consideration when determining a list of vehicles that may be of interest to the user 102.

In some implementations, the cost engine 120 calculates a total cost of ownership that is predicted for the user 102 to own one or more particular vehicles. The total cost of ownership may be a sum of the user's loan payment and the other costs of owning or operating the vehicle, such as the cost of fuel, repairs, maintenance, and insurance. The fuel, repair, and maintenance costs may be determined based on historical data that show typical fuel, repair, and/or maintenance costs for particular vehicles over their lifetime. The insurance cost may be determined based on the particular vehicle as well as information regarding the user 102 (e.g., their age, location, etc.) and information regarding the user's insurance policy (e.g., type(s) of coverage, limits, deductible, etc.). In some instances, the estimated fuel, repair, and/or maintenance costs may be based at least partly on characteristics of the user as well as characteristics of the vehicle. For example, such costs may be determined based on user characteristics such as the distance the user drives (or expects to drive) per month, and/or the types of activities that the user engages in (or is expected to engage in) with the vehicle, such as racing, off-road driving, hauling, long trips, short commutes, and so forth.

The cost engine 120 may also calculate a total cost of ownership for the user 102 to own a vehicle generally, where the total cost of ownership is not specific to a particular vehicle. In such instances, the loan cost may be based on a loan that the user 102 has applied for and been approved for, the loan indicating the price of a vehicle that the user 102 is qualified to buy. The other costs, such as fuel, maintenance, repair, and/or insurance, may be estimated based on average costs of such expenses over a population of users and/or vehicles, or may be estimated based on the amount that the user 102 has spent on such expenses in the past (e.g., while operating previously owned vehicles).

The cost engine 120 may determine the cost of ownership of vehicle(s), or the non-vehicle-specific cost of ownership, and the cost may be presented to the user 102 through the interface 110. In this regard, the cost engine 120 provides a calculator of total cost of ownership that can be used to help a user 102 choose a vehicle to purchase. In some implementations, the platform may be part of a banking service where the user 102 has bank accounts or otherwise is a financial services customer. In such instances, the platform may have access to financial information for the user 102, such as their monthly income, other expenses, other debts, other assets, and so forth. In such instances, the interface 110 may present the total cost of ownership information to the user 102 along with information regarding the user's monthly budget. In some examples, the monthly income of the user 102 may be determined based on characteristics of the user 102. For example, a user 102 who serves in the military may have a particular military pay grade, and their monthly salary may be determined based on that pay grade (e.g., based on a lookup table of pay grade mapped to monthly pay).

The interface 110 may provide a personalized search interface for the user 102, to enable the user 102 to access vehicle purchase price recommendations (e.g., how much can you spend?) based on the total cost of ownership and based on the user's income. For example, the interface 110 may present a list of vehicles that are search results and/or recommended for the user 102, and the interface 110 may present total cost of ownership information for each vehicle along with the user's other financial information regarding how much they can afford to spend each month. In some implementations, the user 102 may select a vehicle from the search results and/or recommendations list and, in response, the interface 110 may present details regarding the selected vehicle along with the total cost of ownership and the user's budget information.

In some instances, the calculation of the total cost of ownership is performed in real time in response to the user's selection of a particular vehicle through the interface 110, and the cost is calculated for the particular vehicle. In some instances, the calculation of the total cost of ownership is performed prior to, and/or independently of, a selection of a particular vehicle by the user 102. In the latter case, the initial estimate of the total cost of ownership may be based on possibly incomplete and/or partial information regarding the user's circumstances, prior to the user's selection of a particular car. For example, the platform may determine that the user 102 is able to afford a $20,000 vehicle based on the user's income and/or other financial characteristics. The total cost of ownership may be determined based on a loan in that amount, with particular loan terms, and the cost may be presented to the user 102 through the interface 110. The selection of a particular vehicle by the user 102 may prompt the platform to re-evaluate and/or refine its initial estimate based on the particular cost information for the selected vehicle.

In some implementations, the total cost of ownership for a selected vehicle may be compared with the total cost of ownership for the user's current vehicle, and such information may allow the user 102 to compare their current situation with a possible future situation to determine whether to replace their current vehicle with the selected vehicle. The interface 110 may also present information regarding the user's current monthly budget, and/or how much of that budge would remain every month if the user 102 kept their current vehicle or purchased the selected vehicle.

The server computing device(s) 108 can execute a pre-negotiation engine 124 that performs operations for pre-negotiation of a vehicle purchase, as described herein. After the user 102 has indicated the particular vehicle to be purchased, the integration engine 112 may submit a request to one or more of the remote data services 118, requesting an initial estimate of a purchase price for the selected vehicle and a list of (e.g., local) sellers that have the vehicle available for sale. The remote service(s) may respond with the initial price estimate, and may also provide a list of sellers that have the vehicle available for sale (or that may obtain the vehicle within a short period of time). The sellers may be determined based on their current inventory, and/or based on their location being in proximity to the user's location. For example, seller(s) within a same city, county, and/or metropolitan area may be identified, and/or seller(s) within a threshold distance (e.g., 25 miles) of the user's location.

The pre-negotiation engine 124 can initiate a reverse auction by sending, to one or more seller computing devices 126 of the identified available seller(s), a request for the seller(s) to each submit a bid. The seller(s) may respond with a bid that indicates a price at which the seller is willing to sell the vehicle to the buyer. The pre-negotiation engine 124 may identify the lowest bid from among the submitted bids. The lowest bid may be presented, through the interface 110, to the user 102. In response to the user 102 accepting the bid and agreeing to purchase the vehicle from the lowest bidding seller, a confirmation message may be sent to the seller. As described above, the seller may accept the confirmation of the sale and commit to abiding by the pre-negotiated terms of the sale, including the sale price of the seller's bid.

FIG. 2 depicts an example interface 110, according to implementations of the present disclosure. As shown in the example, the interface 110 may include any suitable number of tiles each presenting information regarding a particular aspect of the vehicle buying process. For example, the tiles may include tiles for one or more of the following: "Get Prepared to Buy," "What's My Car Worth," "How Much Should I Spend," "Find My Next Car," Apply for Financing," "How to Make the Purchase," and/or "Insure My Car." The interface may also include a tile to present a certificate for a vehicle, e.g., "My Vehicle Certificate."

The "Get Prepared to Buy" feature of the application 106 may be used early in the vehicle purchase process to enter preliminary information describing the user's overall preferences for the vehicle purchase process. On selecting the "Get Prepared to Buy," tile, the interface 110 may present preliminary questions to enable the user to customize their vehicle buying experience. For example, the user may be asked to enter information regarding: whether they have already found a vehicle to buy, when they are planning to buy the vehicle (e.g., within one week, within one month, within six or more months, not sure, etc.), how much down payment they are planning to make, whether they are replacing a currently owned vehicle, whether they plan on buying from a dealer, private seller, or are not sure yet, and/or other questions. The data entered through this screen may be used to customize the purchase process for the user, for example by showing used versus new vehicles, vehicles available from a dealer versus from a private seller, vehicles that are available within a short time period (e.g., for purchase within the week) versus vehicles that may be available later, and so forth.

The "What's My Car Worth" feature may be used to enter information regarding the user's current vehicle, if any. Selecting this tile may prompt the interface 110 to present a screen that lets the user enter their current vehicle (e.g., make, model, year, features, etc.). In response, the interface 110 may show information regarding the vehicle such as its private seller value and/or trade-in value. Such data may be collected from a data service that provides information describing the current value of various vehicles according to their make, model, year, options, and/or other vehicle characteristics.

FIG. 3 shows an example of the interface 110 that is shown in response to the user selecting the "How Much Should I Spend?" tile shown in FIG. 2. This budgetary constraints screen may be populated based on information regarding the user, such as their current assets, debts, monthly income, monthly expenses (including other debt payments), and so forth. For example, the screen may include a section 302 that presents income information for the user 102, such as their pay amount and how frequently they are paid. Such data may be entered by the user and/or received from a data service, such as a bank, credit union, or other financial institution. In some instances, the pay amount and frequency may be determined based on known characteristics of the user 102, such as their military pay grade as described above. The screen may show information regarding the value to be provided by the user 102 to purchase the vehicle, such as information 304 indicating whether they are trading in a vehicle, and information 306 showing the particular trade-in vehicle, its value, how much is still owed, and the amount that the user 102 is providing as a down payment for the new vehicle. The screen may include controls 308 that enable the user 102 to submit their entered information and navigate to the next screen ("Make the Right Choice"), or cancel and clear their currently entered information.

FIG. 4 shows an example of the interface 110 that is shown in response to the user 102 submitting the information entered on the "How Much Should I Spend" screen shown in FIG. 3. As shown in the example, the screen may present total cost of ownership information 402 prior to the user's selection of a particular vehicle. The information 402 may include a graphical display (e.g., a cost wheel) of the total cost of ownership that includes component costs for estimated loan payment and other estimated expenses/costs (e.g., fuel, repair, maintenance, insurance, etc.). In this example, the component costs are presented as arcs within a circular graphic, in which the total cost is the total angular arc (e.g., 360 degrees), and the component costs are individual arcs that, in total, add up to the total angular arc. Implementations also support the use of other types of graphical or non-graphical presentation of total cost and component costs. In the example shown, the total cost and component costs are presented as numeric values as well as depicted graphically in the cost wheel.

The screen may also present information 404, describing the financial effect of the user 102 maintaining their current vehicle compared to the effect of replacing it with a different vehicle (e.g., "Impact to Your Wallet"). In this example, the information 404 indicates the user's budget with their current car, the amount of money that the user 102 has available to spend each month as the difference between their monthly income and the total monthly cost of their current vehicle. The information 404 also presents, as a comparison, the user's projected budget with the new vehicle, if they were to replace their current vehicle with a different vehicle. This comparison may be graphically presented, as shown in FIG. 4, with an indication of the difference in available monthly budget under the two scenarios. The screen may include controls 406 that enable the user 102 to submit their entered information and navigate to the next screen ("Find My Next Car"), or cancel and clear their currently entered information. In some instances, the user's selection of a vehicle may lead to a determination that their remaining monthly budget is a negative number, e.g., that the vehicle would cost more than the user's monthly income. In such instances, the interface may provide a warning that the vehicle is beyond affordability for the user 102, and/or may indicate (through a particular color or other graphical element) that the remaining monthly budget is negative.

The "Find My Next Car") screen may present a list of vehicles that are recommended for the user and/or vehicles that the user has previously flagged (e.g., liked, favorited, preferred, etc.) through the vehicle search data service interface. In some instances, the list may be determined based on the total cost of ownership. In some instances, the list may be determined based on the user's search criteria and/or expressed preferences, and the vehicles in the list may be flagged with a graphical indication of whether the vehicle is recommended for the user 102, or not recommended, based on the total cost of ownership (e.g., what the user can afford to spend) and based on the user's budgetary constraints.

In some implementations, the data provided by the user and/or retrieved from data service(s) may be employed to generate (e.g., prepopulate) a loan application based on the particular financial characteristics or other characteristics of the user, such as their credit history, credit score, current lines of credit, employment, and so forth, and that loan information may be presented in the financing item (e.g., "Apply for Financing"). Such data may also be employed to generate an insurance policy application based on the particular characteristics of the user, such as their driving history, location, vehicle usage patterns (e.g., number of miles driven per year), whether the vehicle is to be used for personal and/or commercial purposes, and so forth. Insurance policy information may be presented to the user through the "Insure My Car" tile of the interface. The financing and insurance tiles may be employed by the user to apply for a loan and/or insurance policy respectively. The tiles may also, respectively, show current status of the loan and insurance applications, including whether the user has been approved, whether more information is being requested from the user, whether funds for the loan have been disbursed, whether the insurance policy is currently active, and/or other information.

Through the integration of total cost of ownership determination, vehicle search, loan application processing, insurance application processing, pricing data (e.g., for a guaranteed vehicle price), budget information, and/or other information, the platform and its interface 110 supports a seamless and/or expedited process for purchasing a vehicle or other item. This process may be personalized for the particular user 102, such that the total cost of ownership data, loan information, insurance information, and/or other transaction data may be particularly generated for and tailored to the user. The implementations described herein may be employed to provide the user 102 with a seamless, hassle-free, vehicle search and purchase experience that may involve less negotiation than traditional vehicle buying experiences. In some implementations, the vehicle may be purchased without requiring the user to negotiate and/or haggle with a seller and/or sales personnel at a dealership.

Figure 5:
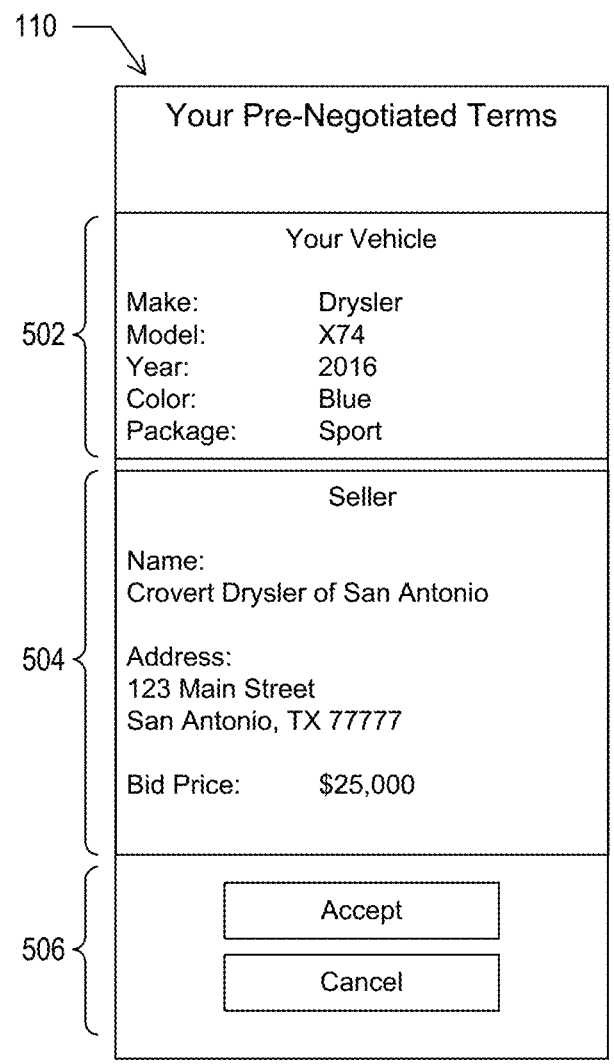

FIG. 5 shows an example of the interface 110 that is shown to provide information regarding the pre-negotiation process. In some implementations, the screen of FIG. 5 may be shown as part of the application 106, such as a screen that is shown as one of the "How to Make the Purchase" features of the application. As shown in this example, the screen may include a section 502 describing the characteristics of the vehicle that the user has selected for purchase. A section 504 may show information regarding the seller that is selected through the pre-negotiation reverse auction process. This information may include the name, address, and/or other contact information for the seller. The information may also include the bid price submitted by the seller. The screen may include controls 506 that enable the user 102 to accept the bid and agree to purchase the vehicle from the indicated seller, or cancel the purchase.

Figure 6:
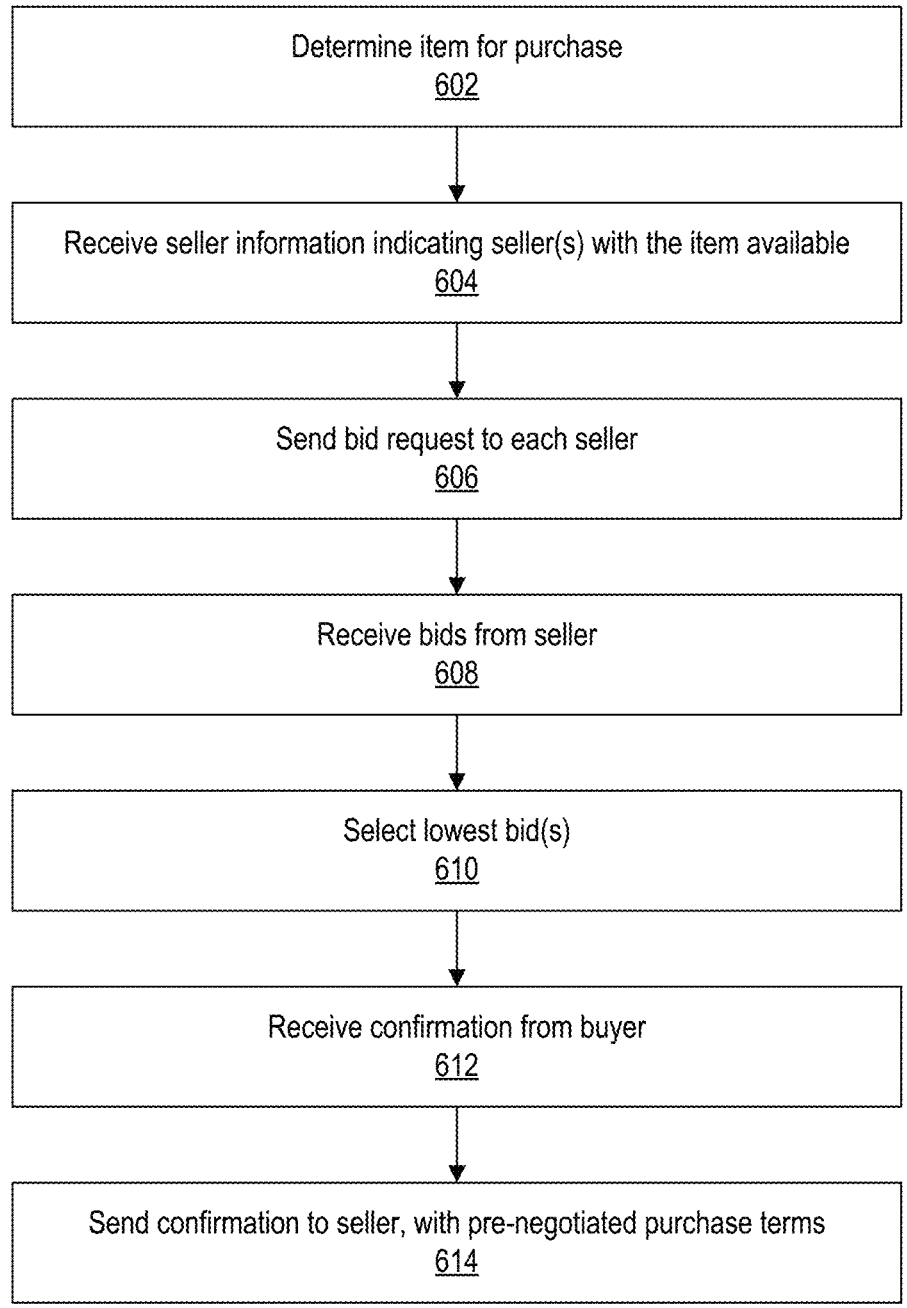
FIG. 6 depicts a flow diagram of an example process for pre-negotiating an item purchase, according to implementations of the present disclosure.

FIG. 6 depicts a flow diagram of an example process for pre-negotiating an item purchase, according to implementations of the present disclosure. Operations of the process can be performed by one or more of the application 106, the interface 110, the integration engine 112, the ML module(s) 116, the cost engine 120, the search engine 122, the data service(s) 118, the pre-negotiation engine 124, and/or other software module(s) executing on the server computing device(s) 108, the user device 104, or elsewhere.

The item for purchase can be determined (602). In some instances, the item is selected by the user, such as through a search engine or other suitable mechanism. In some examples, a request is transmitted or otherwise provided to a remote or local service, the request identifying an item (e.g., vehicle) that the user has indicated for purchase transaction or other type of transaction (e.g., lease transaction).

Seller information is received (604) indicating one or more sellers that have the item available (e.g., for purchase or lease). The availability of the item can indicate that the seller has the item in stock and/or that the seller can readily obtain the item for the user. In some instances, the seller information is transmitted or otherwise provided to the platform by a remote or local service, in response to the request for seller information. The seller information may indicate an initial purchase price (e.g., an estimated price) and/or one or more sellers that have the item available.

A bid request can be transmitted (606) to a seller computing device associated with each seller identified in the seller information. The bid request may be a request for a seller to provide a bid purchase price, indicating that the seller can sell the item to the user at the bid purchase price.

In response to the transmitted bid request, a bid may be received (608) from one or more of the seller computing devices. The lowest one or more bids can be selected (610), and the seller information describing the seller(s) that provided those bids can be transmitted to the user device for display to the user. In some examples, the lowest N bids (e.g., N=3) can be communicated to the user device and presented to the user, and the user can select among those bids. In some examples, a single bid (e.g., the lowest bid) of a single seller can be presented to the user. In some examples, other information can be used to determine which bids to present to the user, including but not limited to seller location, seller reputational information, seller transaction history, and so forth. The user can select from among the presented bids, and/or confirm acceptance of the single provided bid.

Following the user's confirmation of one of the bids (612), or an identification of the lowest bid among the received bids, a confirmation message is sent (614) to the seller that has been selected. The seller may then commit to sell the item to the user according to the pre-negotiated terms of the sale. The seller's commitment to sell the item according to the pre-negotiated terms can be communicated from the seller to the platform, and in some examples the confirmation can be communicated to the user from the platform. The seller's commitment may provide the seller's guarantee that the seller will sell the item to the user at the pre-negotiated terms, with the locked in financing and at the agreed-upon price that corresponds to the seller's bid.

In some examples, the communications between the platform and the seller(s), and between the platform and the user (e.g., buyer), may be through transmissions that are sent over one or more networks between computing devices that are associated with the different parties. For example, the buyer's user device 104 can communicate with the platform that executes on one or more computing devices (e.g., server computing device(s) 108). The platform can communicate with one or more computing devices that provide remote services (e.g., service(s) for handling the reverse auction to collect seller bids). In some examples, the platform performs the reverse auction through a local service executing on the platform, and seller bids are collected through operation of the local service. In some implementations, the platform communicates over one or more networks with computing devices associated with the seller(s), to send the request for bids, receive the bids, send the confirmation to the selected seller, and/or receive the seller's commitment as described above. Although examples herein may describe a transaction that is a purchase of an item, other types of transactions are supported by implementations, including but not limited to leases, rental arrangements, borrowing or sharing arrangements, and so forth.

Figure 7:
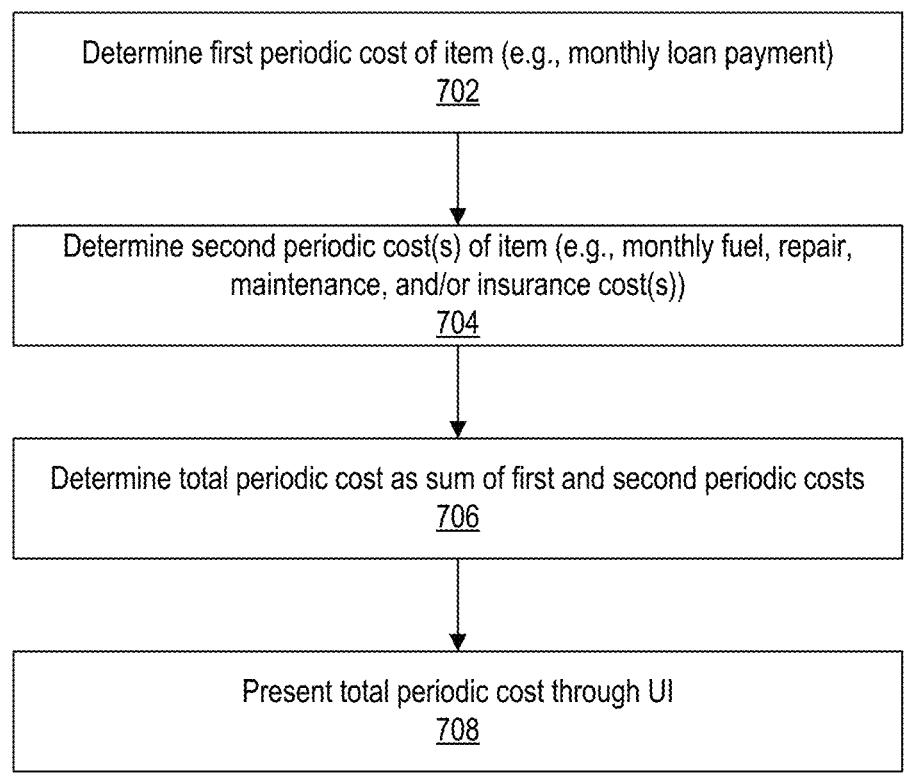
FIG. 7 depicts a flow diagram of an example process for cost analysis, according to implementations of the present disclosure.

FIG. 7 depicts a flow diagram of an example process for cost analysis, according to implementations of the present disclosure. Operations of the process can be performed by one or more of the application 106, the interface 110, the integration engine 112, the ML module(s) 116, the cost engine 120, the search engine 122, the data service(s) 118, and/or other software module(s) executing on the server computing device(s) 108, the user device 104, or elsewhere.

A first periodic cost of an item is determined (702). In some implementations, the first periodic cost is a cost that is determined based on the user's characteristics, such as financial characteristics. For example, as described above the first periodic cost can be a periodic (e.g., monthly) loan payment that is determined based on the amount of loan that the user applies for and is approved for. Although examples herein describe the calculation of costs, e.g., total cost and component costs, as monthly costs, implementations support the use of other periodicities for determining cost information, such as yearly, weekly, bi-monthly, and so forth.

One or more second periodic costs of an item are determined (704). The second periodic costs may be costs that are based on the vehicle and/or the user 102, such as the periodic (e.g., monthly) cost of fuel, repairs, maintenance, insurance, and so forth, as described above.

The total periodic cost is calculated (706) as the sum of the first and second periodic costs, and presented (708) through the UI 110 as described above. In some instances, the first cost, second cost(s), and/or total cost are determined as estimated costs prior to the user 102 selecting a particular vehicle. In such instances, the first cost is determined based on the amount of the user's approved loan, and the second cost(s) and typical cost(s) for vehicle ownership and/or cost(s) that are determined based on the amount that the user has historically paid for such expenses. In some instances, the first cost, second cost(s), and/or total cost are determined as estimated costs based on the user's selection of a particular vehicle. In such instances, the second cost(s) (e.g., fuel, repair, maintenance) may be based on the typical amounts of such expenses for the selected vehicle.

Figure 8:
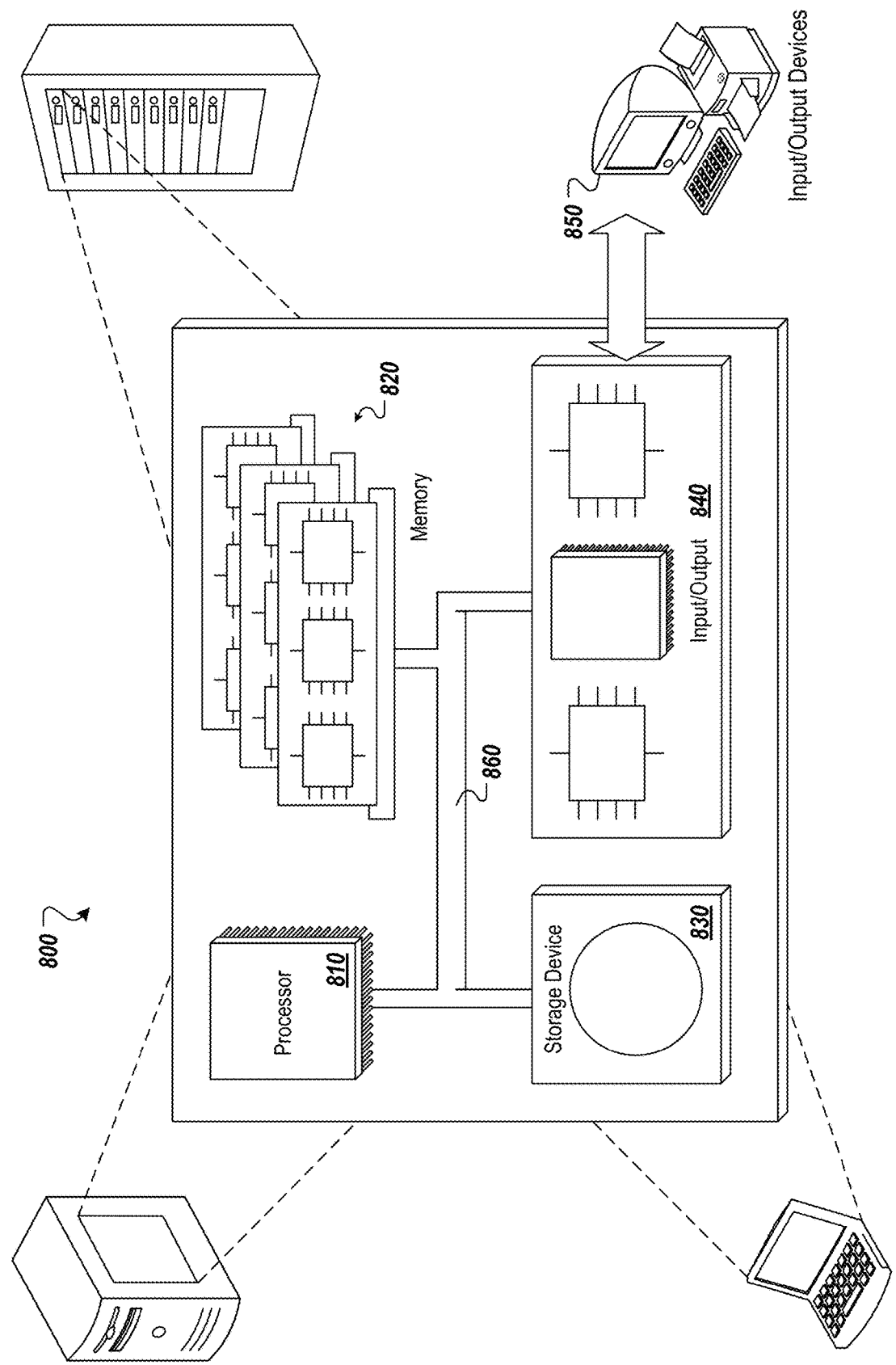
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. For example, the system 800 may be included, at least in part, in one or more of the user device 104, the server computing device(s) 108, the computing device(s) that provide the data service(s) 118, computing device(s) of the seller(s) 126, and/or other computing device(s) or system(s) described herein. The system 800 may include one or more processors 810, a memory 820, one or more storage devices 830, and one or more input/output (I/O) devices 850 controllable via one or more I/O interfaces 840. The various components 810, 820, 830, 840, or 850 may be interconnected via at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. For example, the processor(s) 810 may execute instructions for the various software module(s) described herein. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more communication networks using any network protocol.

Computing devices of the system 800 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A system comprising:
at least one processor; and
a memory communicatively coupled to the at least one processor, the memory storing instructions which, when executed, cause the at least one processor to perform operations comprising:
identifying a set of available vehicles for sale using a machine learning model trained, based on user interactions within a user account, to identify vehicles that match on or more of a particular user's preferences;
providing, for presentation on a mobile computing device, a graphical user interface (GUI) comprising a list of a plurality of vehicles for sale, wherein the list includes at least one of the vehicles from the set of available vehicles;
determining, based on location data from a satellite navigation system of the mobile computing device, that the mobile computing device is located at a geographical location of a seller for a period of time; and
in response to determining that the mobile computing device is located at the geographical location of the seller for the period of time, providing data to update the list in the GUI, wherein the data includes information associated with one or more vehicles that are in stock at the geographical location of the seller.

2. The system of claim 1, further comprising determining that the mobile computing device has been located at the geographical location of the seller for a period of time that exceeds a threshold time period, and, in response, providing a notification for display on the mobile computing device, wherein the notification requests whether a user of the mobile computing device requires assistance while at the geographical location of the seller.

3. The system of claim 1, wherein the operations further comprise:
receiving user input indicating as selection of a vehicle from among the list of vehicles; and
in response to the user input, determining a total periodic cost for the vehicle, including a periodic payment for a loan to be used to purchase the vehicle.

4. The system of claim 3, wherein:
an amount of the loan is an initial price of the vehicle; and
the amount of the loan is adjusted based on an offer price provided by the seller.

5. The system of claim 3, the operations further comprising:
calculating a first periodic cost of the vehicle, wherein the first period cost is calculated based at least partly on at least one characteristic of a purchaser of the vehicle;
determining at least one second periodic cost of the vehicle, wherein the at least one second periodic cost is calculated based at least partly on at least one characteristic of the vehicle;
determining the total periodic cost of the vehicle as a sum of the first periodic cost and the at least one second periodic cost; and
presenting the total periodic cost through the GUI.

6. The system of claim 5, wherein the at least one second periodic cost includes one or more of a fuel cost, a maintenance cost, a repair cost, and an insurance cost.

7. The system of claim 5, wherein the first periodic cost is a periodic payment for the loan that is calculated based on at least one financial characteristic of the purchaser.

8. The system of claim 5, wherein determining the at least one second periodic cost of the vehicle includes requesting, from at least one other service, vehicle information that describes the at least one second periodic cost of the vehicle.

9. The system of claim 5, wherein determining the at least one second periodic cost of the vehicle includes:
requesting, from at least one other service, vehicle information associated with the vehicle; and
calculating the at least one second periodic cost of the vehicle based on the vehicle information and at least one behavioral characteristic of the purchaser.

10. The system of claim 9, wherein:
the vehicle information describes typical gas mileage for the vehicle;
the at least one behavioral characteristic includes a typical distance driven during a period used to calculate the at least one second periodic cost; and
calculating the at least one second periodic cost includes calculating an expected fuel cost based on the gas mileage of the vehicle and the typical distance driven.

11. A computer-implemented method, comprising:
identifying a set of available vehicles for sale using a machine learning model trained, based on user interactions within a user account, to identify vehicles that match one or more of a particular user's preferences;
providing, for presentation on a mobile computing device, a graphical user interface (GUI) comprising a list of a plurality of vehicles for sale, wherein the list includes at least one of the vehicles from the set of available vehicles;
determining, based on location data from a satellite navigation system of the mobile computing device, that the mobile computing device is located at a geographical location of a seller for a period of time; and
in response to determining that the mobile computing device is located at the geographical location of the seller for the period of time, providing data to update the list in the GUI, wherein the data includes information associated with one or more vehicles that are in stock at the geographical location of the seller.

12. The method of claim 11, further comprising determining that the mobile computing device has been located at the geographical location of the seller for a period of time that exceeds a threshold time period, and, in response, providing a notification for display on the mobile computing device, wherein the notification requests whether a user of the mobile computing device requires assistance while at the geographical location of the seller.

13. The method of claim 11, wherein the method further comprises:
receiving user input indicating as selection of a vehicle from among the list of vehicles; and
in response to the user input, determining a total periodic cost for the vehicle, including a periodic payment for a loan to be used to purchase the vehicle.

14. The method of claim 13, wherein:
an amount of the loan is an initial price of the vehicle; and
the amount of the loan is adjusted based on an offer price provided by the seller.

15. The method of claim 13, further comprising:
calculating a first periodic cost of the vehicle, wherein the first period cost is calculated based at least partly on at least one characteristic of a purchaser of the vehicle;
determining at least one second periodic cost of the vehicle, wherein the at least one second periodic cost is calculated based at least partly on at least one characteristic of the vehicle;
determining the total periodic cost of the vehicle as a sum of the first periodic cost and the at least one second periodic cost; and
presenting the total periodic cost through the GUI.

16. The method of claim 15, wherein the at least one second periodic cost includes one or more of a fuel cost, a maintenance cost, a repair cost, and an insurance cost.

17. The method of claim 15, wherein the first periodic cost is a periodic payment for the loan that is calculated based on at least one financial characteristic of the purchaser.

18. The method of claim 15, wherein determining the at least one second periodic cost of the vehicle includes requesting, from at least one other service, vehicle information that describes the at least one second periodic cost of the vehicle.

19. One or more non-transitory computer-readable storage media storing instructions which, when executed, cause at least one processor to perform operations comprising:
identifying a set of available vehicles for sale using a machine learning model trained, based on user interactions within a user account, to identify vehicles that match one or more of a particular user's preferences;
providing, for presentation on a mobile computing device, a graphical user interface (GUI) comprising a list of a of vehicles for sale, wherein the list includes at least one of the vehicles from the set of available vehicles;
determining, based on location data from a satellite navigation system of the mobile computing device, that the mobile computing device is located at a geographical location of a seller for a period of time; and
in response to determining that the mobile computing device is located at the geographical location of the seller for the period of time, providing data to update the list in the GUI, wherein the data includes information associated with one or more vehicles that are in stock at the geographical location of the seller.

20. The one or more computer-readable storage media of claim 19, wherein the operations further comprise:
receiving user input indicating as selection of a vehicle from among the list of vehicles;
in response to the user input, determining a total periodic cost for the vehicle, including a periodic payment for a loan to be used to purchase the vehicle, wherein determining the total periodic cost comprises:
calculating a first periodic cost of the vehicle, wherein the first period cost is calculated based at least partly on at least one characteristic of a purchaser of the vehicle;
determining at least one second periodic cost of the vehicle, wherein the at least one second periodic cost includes one or more of a fuel cost, a maintenance cost, a repair cost, and an insurance cost;
determining the total periodic cost of the vehicle as a sum of the first periodic cost and the at least one second periodic cost; and
presenting the total periodic cost through the GUI.

* * * * *

UNITED STATES PATENT AND TRADEMARK OFFICE
CERTIFICATE OF CORRECTION

| | | |
|---|---|---|
| PATENT NO. | : 11,676,202 B1 | |
| APPLICATION NO. | : 17/231890 | |
| DATED | : June 13, 2023 | |
| INVENTOR(S) | : Brian Latronico et al. | |

It is certified that error appears in the above-identified patent and that said Letters Patent is hereby corrected as shown below:

On the Title Page

Column 2 (item (56) Other Publications), Line 5, delete "/professional/" and insert -- /professional" --.

In the Claims

Column 23, Line 18, Claim 1, delete "on" and insert -- one --.

Signed and Sealed this
Seventh Day of November, 2023

Katherine Kelly Vidal
*Director of the United States Patent and Trademark Office*